United States Patent [19]

Sunada et al.

[11] Patent Number: 5,702,322
[45] Date of Patent: Dec. 30, 1997

[54] HYDRAULIC PRESSURE CONTROL SYSTEM FOR HYDRAULICALLY OPERATED VEHICLE TRANSMISSION

[75] Inventors: Satoru Sunada; Shoichi Tanizawa, both of Wako, Japan

[73] Assignee: Honda Giken Kogyo Kabushiki Kaisha, Tokyo, Japan

[21] Appl. No.: 610,139

[22] Filed: Feb. 29, 1996

[30] Foreign Application Priority Data

Mar. 2, 1995 [JP] Japan ............................. 7-068753

[51] Int. Cl.⁶ ..................... F16H 59/48; F16H 61/06
[52] U.S. Cl. ......................... 477/120; 477/154; 477/155
[58] Field of Search ............................ 477/143, 154, 477/120, 155, 163, 164

[56] References Cited

U.S. PATENT DOCUMENTS

| | | | |
|---|---|---|---|
| 5,345,842 | 9/1994 | Kondo | 477/154 |
| 5,475,595 | 12/1995 | Asahara et al. | 477/154 |

FOREIGN PATENT DOCUMENTS 60-231056 11/1985 Japan.
2-89861 3/1990 Japan.

*Primary Examiner*—Charles A. Marmor
*Assistant Examiner*—Sherry Lynn Estremsky
*Attorney, Agent, or Firm*—Armstrong, Westerman, Hattori, McLeland & Naughton

[57] ABSTRACT

A system for controlling a vehicle automatic transmission, in which a gear ratio to be shifted to is determined based on the vehicle speed and throttle opening degree and a clutch is supplied with hydraulic pressure such that the rotational speed of the transmission input shaft concurs with a desired rotational speed change rate. The system includes means for discriminating whether the engine load fluctuates and the operation is discontinued when it is discriminated that the engine load fluctuates. Specifically, even when the accelerator pedal is operated only somewhat rapidly and the engine output is able to follow the change in the degree of throttle opening, the degree of throttle opening nevertheless differs between that at the start of gearshift and that in the course of gearshift thereafter, causing unexpected gearshift shock to occur. The arrangement can solve the problem.

9 Claims, 4 Drawing Sheets

1

HYDRAULIC PRESSURE CONTROL SYSTEM FOR HYDRAULICALLY OPERATED VEHICLE TRANSMISSION

BACKGROUND OF THE INVENTION

1. Field of the Invention

This invention relates to a hydraulic pressure control system for a hydraulically operated vehicle transmission, more particularly to such a hydraulic pressure control system which monitors the degree of throttle opening of the vehicle engine to detect operating conditions in which the engine output fluctuates greatly and upon detecting such a condition suspends the clutch pressure control conducted for bringing the change in the rotation of the transmission input shaft to the desired value.

2. Description of the Prior Art

As taught by Japanese Laid-Open Patent Application Nos. Sho 60(1985)-231056 and Hei 2(1990)-89861, it is a known practice to use a linear solenoid, duty solenoid or the like for controlling the oil pressure of a frictional engaging element such as a clutch or brake (referred to simply as "clutch" hereinafter) so as to bring the change in the rotational speed of a member whose rotation changes during gearshift, such as the change in the rotational speed of the transmission input shaft, to a desired value.

In order to prevent gearshift shock, the clutch engaging oil pressure is ordinarily set based on the engine output. In this prior art, the clutch oil pressure for achieving the desired change rate or desired change is determined based on a parameter indicative of engine load such as the degree of throttle opening (accelerator pedal depression) so that the determined value reflects the engine output.

This type of control involves a number of problems. For example, when the driver stomps down on the accelerator pedal, a certain amount of time is required for the engine output to rise to a level corresponding to the changed degree of throttle opening. On the other hand, when the driver very rapidly releases the accelerator pedal, the actual engine output remains high for the degree of throttle opening owing to the continued rotation of the engine by the inertial force up to that time.

Moreover, even when the accelerator pedal is operated only somewhat rapidly and the engine output is able to follow the change in the degree of throttle opening, the degree of throttle opening nevertheless differs between that at the start of gearshift and that in the course of gearshift thereafter. Since the desired rotational speed change or oil pressure change is set in accordance with the degree of throttle opening in the aforesaid clutch pressure control, unexpected gearshift shock is apt to occur when one of the foregoing situations arises in which the engine output does not follow the change in degree of throttle opening or the progress of a gearshift changes in the course thereof.

SUMMARY OF THE INVENTION

An object of this invention is therefore to overcome the aforesaid problems of the prior art by providing a hydraulic pressure control system for a hydraulically operated vehicle transmission which determines a desired rotational speed change constituting a desired value during gearshift, detects change in the state of a vehicle control operation indicative of engine load, and when the state varies, suspends clutch pressure control for achieving the desired rotation change.

This invention achieves this object by providing a system for controlling hydraulic pressure of a hydraulically operated vehicle transmission, comprising vehicle operating condition detecting means for detecting parameters indicative of operating conditions of the vehicle, gearshift command output means for determining a gear ratio to be shifted to based on the detected parameters, to output a gearshift command, a plurality of frictional engaging elements for selectively establishing one gear stage in the transmission, speed detecting means for detecting a rotational speed of at least one of a plurality of rotational members of the transmission which changes at a time of gearshift, desired rotational speed change rate determining means for determining a desired rotational speed change rate of the one rotational member based on at least one of the detected parameters and hydraulic pressure control means for controlling a supply of hydraulic pressure to at least one of the frictional engaging elements in response to the gearshift command such that the determined gear ratio is established to transmit engine power to a vehicle wheel, said hydraulic pressure control means operating to control the supply of hydraulic pressure to the frictional engaging element such that a change of the rotational speed of the one rotational member concurs with the desired rotational speed change rate. In the system, said hydraulic pressure control means includes parameter fluctuation discriminating means for discriminating whether the at least one of the parameters fluctuates, and said hydraulic pressure control means discontinues the operation when said parameter fluctuation discriminating means discriminates that the parameter fluctuates.

BRIEF EXPLANATION OF THE DRAWINGS

The foregoing and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
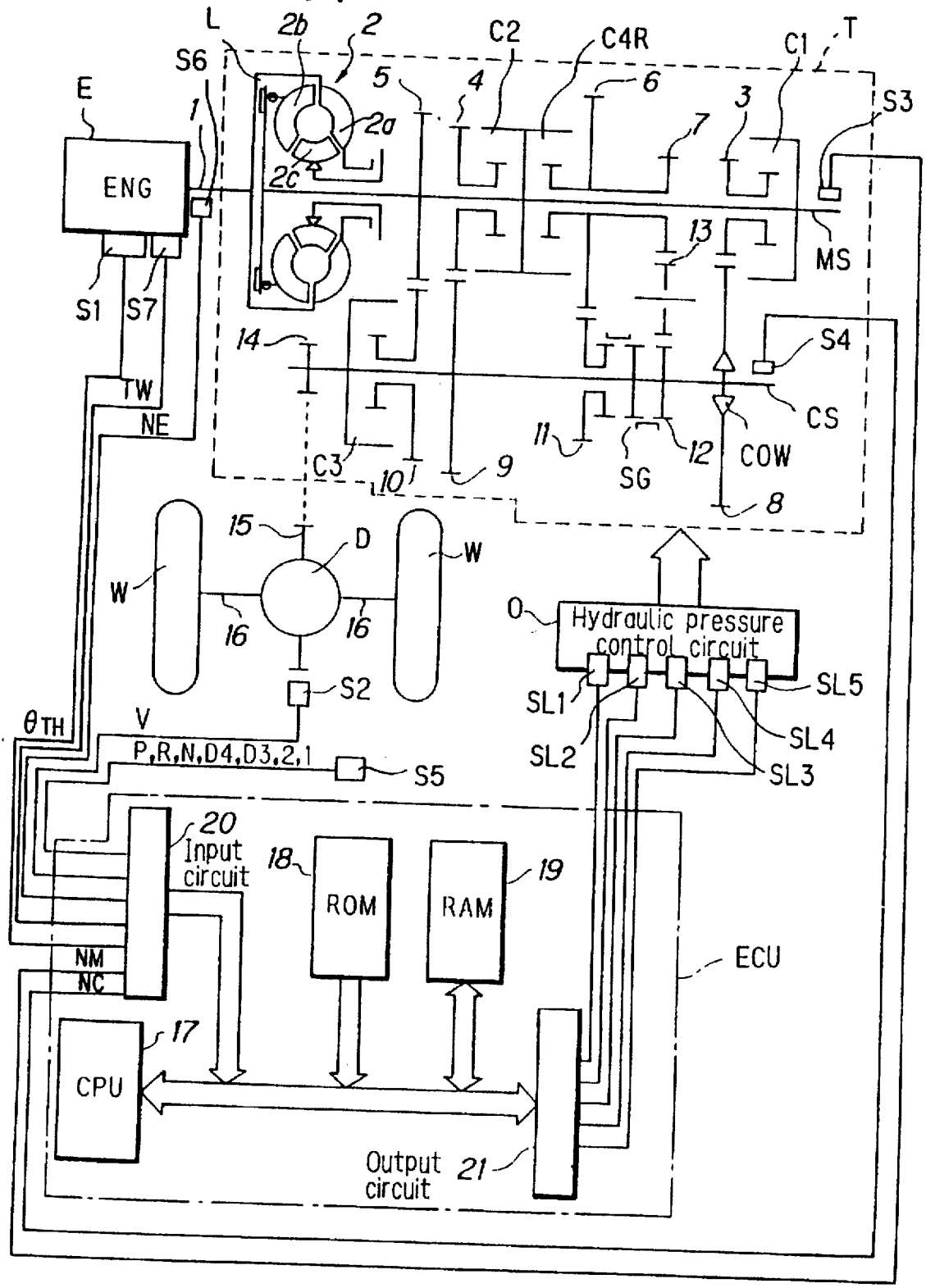
FIG. 1 is an overall view of a hydraulic pressure control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, and 1 has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (gear ratio) and energizes/deenergizes shift solenoids SL1, SL2 of a hydraulic (pressure) control circuit O via the output circuit 21 so as to switch shift valves (not shown) and thereby engage/disengage the hydraulic clutches of prescribed gears, and controls the operation of the lockup clutch L of the torque converter 2 via control solenoids SL3 and SL4. The CPU 17 also controls the clutch hydraulic pressure through a linear solenoid SL5, as will be explained later.

Figure 2:
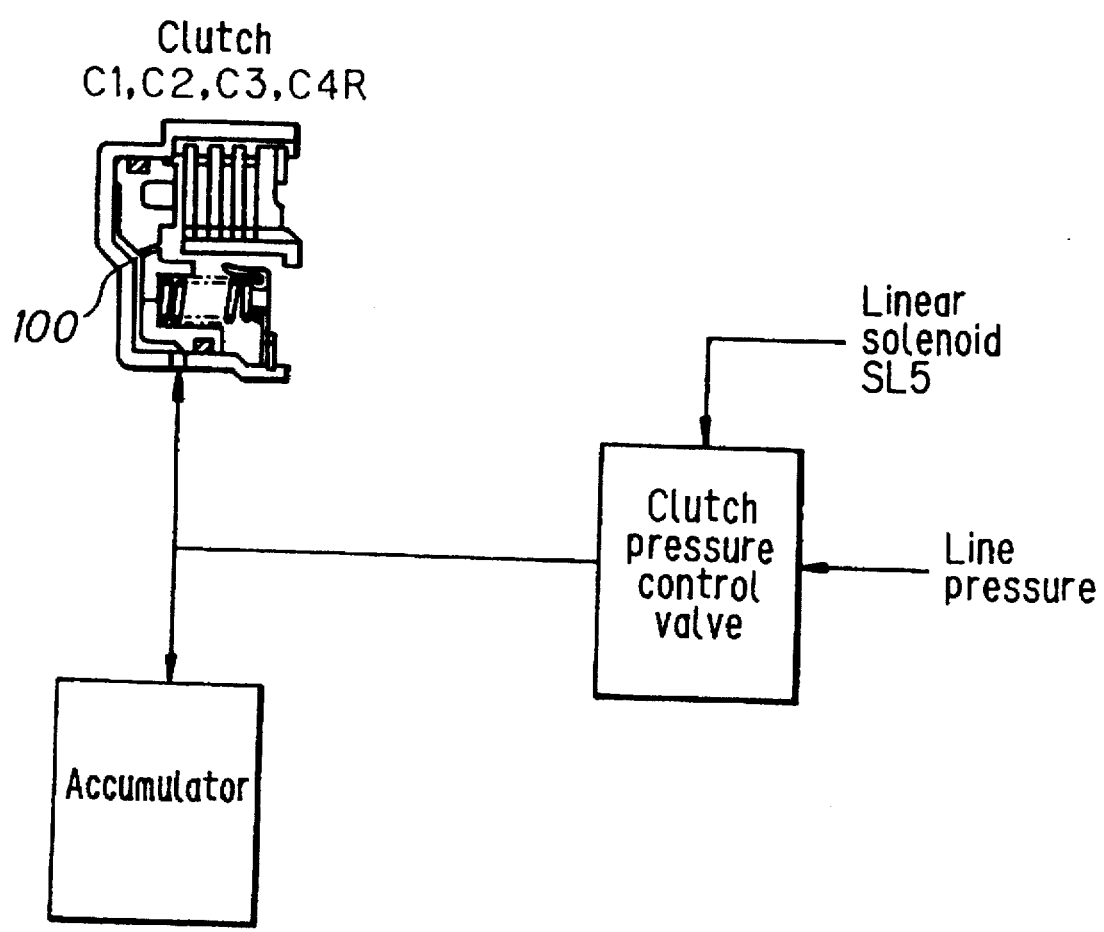
FIG. 2 is an explanatory view showing a part of the hydraulic control circuit of the system illustrated in FIG. 1.

FIG. 2 is an explanatory view showing a part of the hydraulic (pressure) control circuit O of the system of FIG. 1. Line pressure (primary pressure) supplied from a hydraulic pressure source (not shown) is sent to a clutch pressure control valve. The clutch pressure control valve regulates, with the aid of aforesaid linear solenoid SL5, the line pressure within a prescribed throttle pressure range and supplies it to the clutches C1, C2, C3 and C4R. An accumulator is provided in the path to absorb surge pressure.

Thus, in this embodiment, the CPU 17 regulates the line pressure by using the linear solenoid SL5 to control the clutch pressure control valve so that, as explained later, the pressures supplied to the clutches are controlled to the desired value. As shown in FIG. 2, each of the clutches C1, C2, C3 and C4R is provided with a hole 100 for discharge of centrifugal hydraulic pressure. Centrifugal pressure is discharged at the time of clutch release, through a check valve (not shown).

Figure 3:
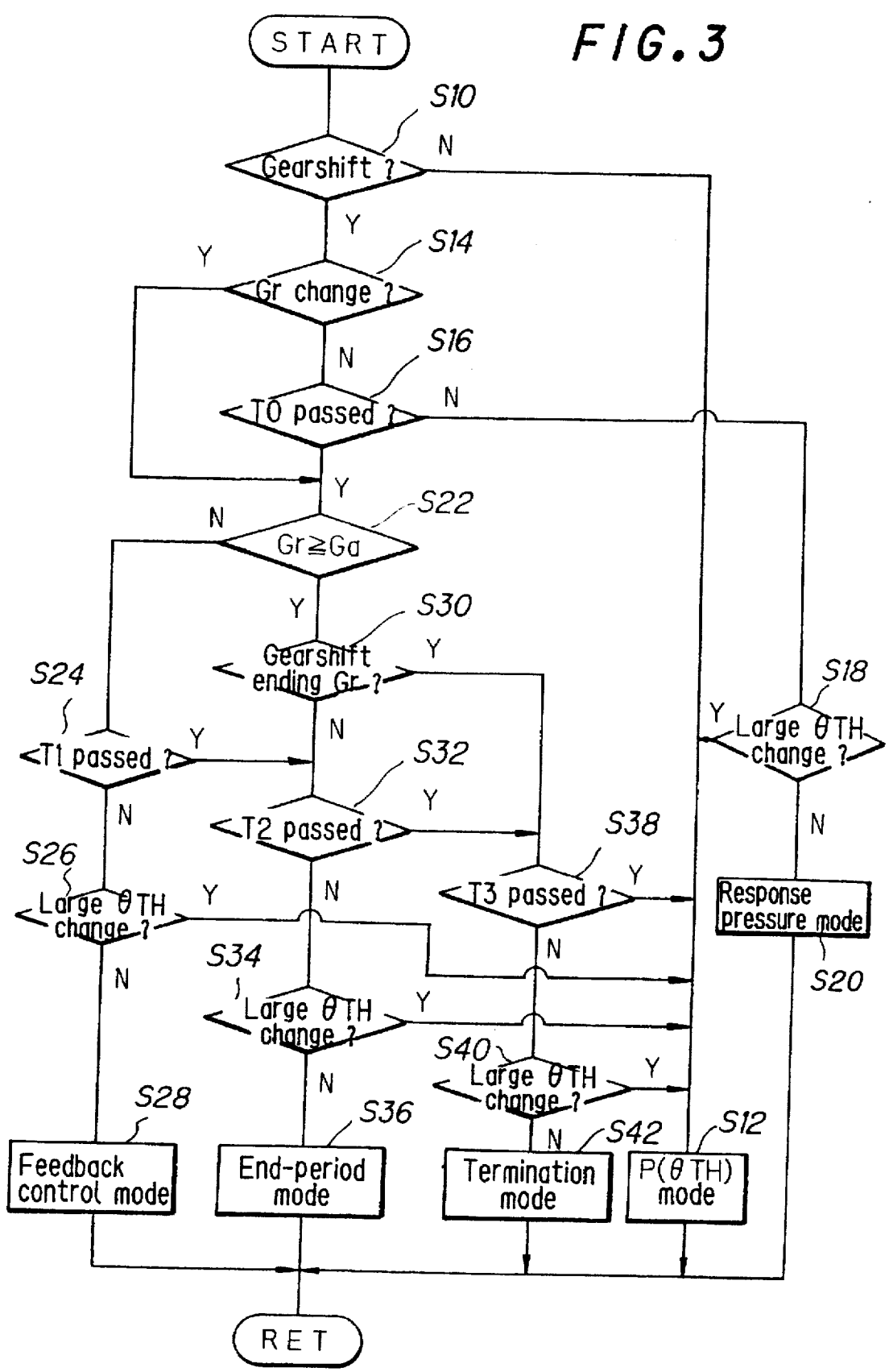
FIG. 3 is a flowchart showing the operation of the system illustrated in FIG. 1.

FIG. 3 is a main routine flowchart showing the operation of the hydraulic pressure control system according to the invention. The explanation of this figure will, however, be preceded by an explanation with reference to FIG. 4.

Figure 4:
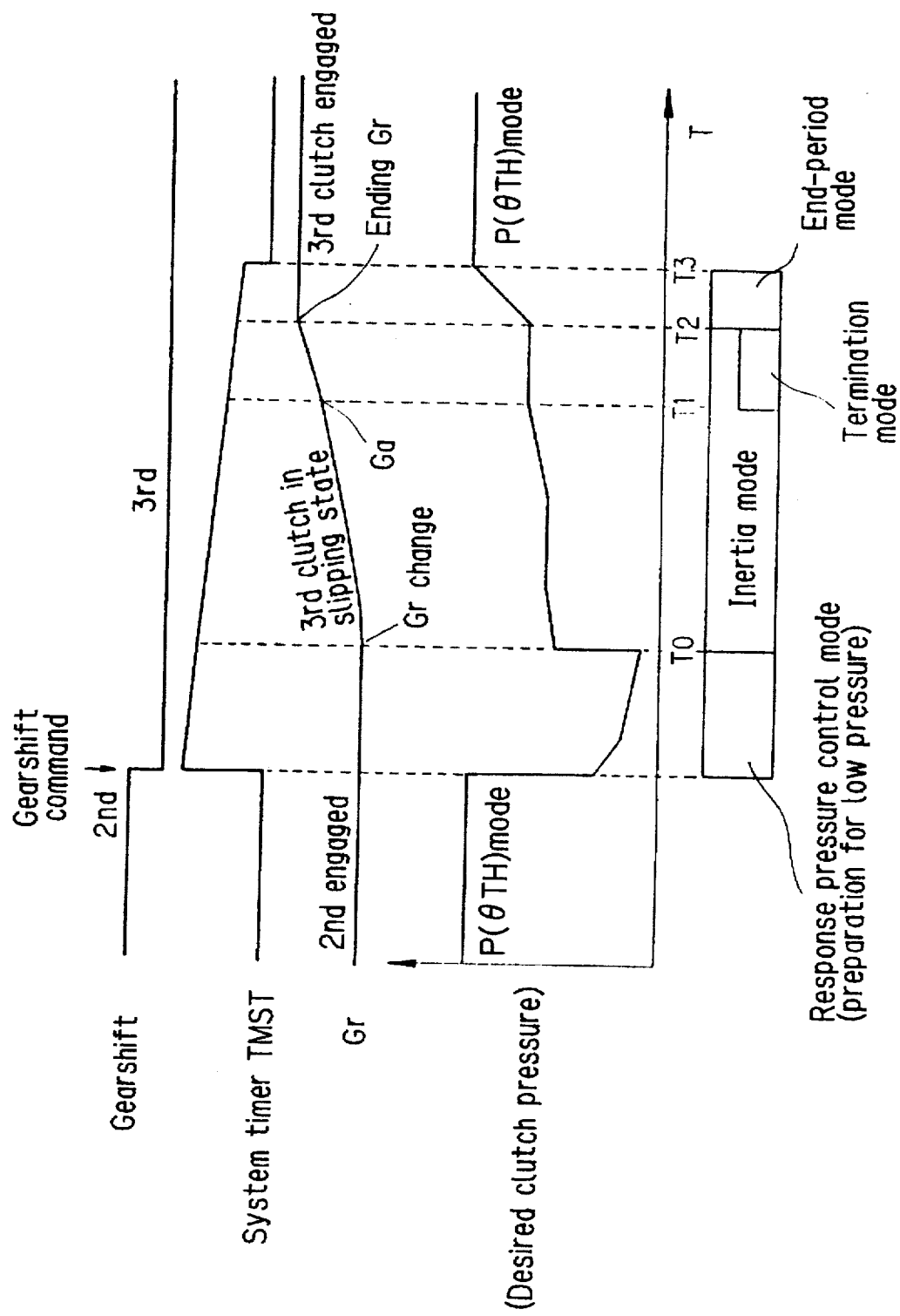
FIG. 4 is a timing chart explaining the procedures illustrated in the flowchart of FIG. 3.

FIG. 4 is a timing chart of the clutch pressure control in the system. As shown in this figure, when gearshift is not in progress the desired clutch pressure is controlled in open-loop manner to a value determined in advance for the gear (gear ratio) concerned and the degree of throttle opening (degree) θTH.

At the start of a gearshift, (operating) oil is supplied up to time T0 for taking up clutch play, and after the play has been taken up, control for maintaining the oil at low pressure and control in the torque phase are conducted. This is indicated as "Response pressure (preparation for low pressure)" in the figure.

The period from time T0 to time T1 corresponds to the inertial phase. As explained earlier, in this phase the clutch pressure is controlled in a closed-loop manner so as to bring the change in the rotational speed of a member whose rotation changes during gearshift, such as the change in the rotational speed of the transmission input shaft (main shaft rotational speed NM), to a desired value.

At the end of the inertia phase, between times T1 and T2, (indicated in the figure as the "End-period mode"), the clutch pressure is feedback controlled for maintaining the clutch pressure especially just before the completion of the gearshift so as to terminate the gearshift smoothly. In the period between times T2 and T3 shown as the "Termination mode" in the figure, the clutch pressure is controlled in open-loop fashion so as to gradually increase the oil pressure toward a value determined in advance for the gear ratio after gearshift and the degree of throttle opening θTH.

The characteristic feature of this system is not directed to the control described in the foregoing, however, but to a system which detects change in the state of a vehicle control operation indicative of engine load, specifically operation (manipulation) of the accelerator pedal, and when the state varies greatly between the start of the response pressure (preparation for low pressure) mode and the end of the termination mode, suspends the control shown in the figure and conducts control in open-loop manner for bringing the oil pressure to a value determined in advance for the gear ratio and the degree of throttle opening θTH.

The operation of the control system will now be explained with reference to the flowchart of FIG. 3. This routine is activated at a timing of once every 20 ms, for example.

First, in S10, it is checked whether gearshift is in progress, i.e., whether the gearshift command shown in FIG. 4 has been issued or output. FIG. 4 shows an example of issuance of a shift signal for an upward shift from second to third gear.

When the result in S10 is NO, the program goes to S12, in which, as described in the foregoing, the clutch pressure is controlled in open-loop fashion to bring it to a value determined for the detected degree of throttle opening θTH in accordance with the predetermined characteristics for the gear (second gear in this example), and the routine is once terminated.

If, when the routine of FIG. 3 is reactivated 20 ms later, the state is one at or after the time point indicated as "Gear-shift" in the timing chart of FIG. 4, the result in S10 becomes YES, and the program goes to S14, in which it is checked whether a change has occurred in the gear ratio Gr. The gear ratio Gr is calculated as:

Gr=Transmission output rotational speed NC1/ Transmission input rotational speed NM.

S14 checks whether a change has occurred in the gear ratio Gr calculated according to this equation, and when the result is NO, the program goes to S16, in which it is checked whether the time T0 has passed. When S16 finds that the time T0 has not passed, the program goes to S18, in which it is checked whether the change in the degree of throttle opening θTH is large (or fluctuating greatly).

This check is made by calculating the first-order difference between the detected values of the degree of throttle opening θTH in the current and preceding cycles and comparing the result with an appropriately set reference value. When it is found that the difference exceeds the reference value, it is discriminated that the change in the degree of throttle opening θTH is large (in other words the throttle opening θTH is fluctuating).

As explained earlier, the purpose of the control according to this embodiment is to eliminate the problems arising when, for example, the engine output cannot keep up with changes in the degree of throttle opening. The reference value is therefore appropriately selected to be of sufficient magnitude for detecting changes in the degree of throttle opening large enough to cause such problems.

When S18 finds the change in the degree of throttle opening θTH to be large, the program goes to S12, in which, for the reason just explained, the same control as when gearshift is not in progress is conducted, namely, the clutch pressure is controlled in open-loop fashion to bring it to the value determined for the detected degree of throttle opening θTH in accordance with the predetermined characteristics for the gear (gear ratio), and the routine is once terminated.

The reason for this is that in a control system which, as explained in the foregoing, controls the clutch pressure during gearshift in accordance with a parameter such as the degree of throttle opening or other indicator set based on engine load so as to reflect the engine output, use of a degree of throttle opening that does not accurately indicate the engine load is liable to degrade rather than improve the control performance and lead to the occurrence of gearshift shock. In this embodiment, therefore, this problem is overcome by conducting the same clutch pressure control as when no gearshift is in progress when the change in the degree of throttle opening is great.

On the other hand, when S18 does not find that the change in the degree of throttle opening is large, the program goes to S20, in which the clutch pressure is open-loop controlled in accordance with the response pressure mode. More specifically, the processing indicated as "Response pressure (preparation for low pressure)" shown in the timing chart of FIG. 4 is conducted from the start of gearshift to time T0.

In the next and following routine cycles, when S16 finds that the time T0 has passed, the program goes to S22, in which it is checked whether the gear ratio Gr is equal to or greater than a prescribed value Ga (shown in FIG. 4). When the result in S22 is NO, the program goes to S24, in which it is checked whether the time T1 has passed. When the result in S24 is NO, the program goes to S26, in which the aforesaid decision is again used to check whether the change in the degree of throttle opening θTH detected at that time is large. When the result is YES, the program goes to S12, in which, for the reason explained earlier, the same control as when gearshift is not in progress is conducted, and the routine is once terminated.

On the other hand, when S26 finds that the change in the degree of throttle opening θTH detected at that time is not large, the program goes to S28, in which feedback control is conducted. In other words, as shown by the inertia mode in the timing chart of FIG. 4, the clutch pressure (specifically, the oil pressure of the clutch C3 on the engagement side in the example) is feedback controlled to bring the change rate of the transmission input rotational speed NM to the desired value, e.g. a constant value.

The relationship between the gear ratio and time is shown in FIG. 4. Specifically, at the start of the gearshift, the gear ratio Gr remains at a value corresponding to second gear for a short time. Then when the supply of oil to the second-speed clutch C2 is stopped in response to the gearshift command, the second-speed clutch begins to slip and the gear ratio gradually changes from that corresponding to second gear. The time point at which this changes starts is detected from the gear ratio Gr.

Since the system according to the invention is equipped with a timer (designated in the figure as "System timer"), it is also possible to detect this time point by clocking the passage of time T0 from the start of gearshift. In the flowchart of FIG. 3, it is detected from both the gear ratio and time passage. The step of confirming time passage in S16 is therefore skipped when S14 finds that a change has occurred in the gear ratio Gr.

In the next and following routine cycles (program loop), when S22 finds that the gear ratio Gr has exceeded the prescribed value Ga, the program goes to S30, in which it is checked whether the gear ratio has reached the gearshift ending gear ratio Gr. As shown in FIG. 4, the gearshift ending gear ratio Gr is a value corresponding to the gear ratio in the destination gear (third gear in this example). The check in S30 therefore amounts to checking whether the third-speed clutch C3 has reached the engagement time point (shown as T2 in FIG. 4).

When S30 finds that the gear ratio has not reached the gearshift ending gear ratio GR, the program goes to S32, in which, by way of confirmation, it is checked from the value of the system timer whether the time T2 for reaching the gearshift ending gear ratio has been reached. When the result is NO, the program goes to S34, in which it is checked in the same manner as that described earlier whether the change in the degree of throttle opening θTH detected at that time is large. When the result is YES, the program goes to S12, in which, for the reason explained earlier, the same control as when gearshift is not in progress is conducted, and the routine is once terminated.

On the other hand, when S34 finds that the change in the degree of throttle opening θTH is not large, the program goes to S36, in which the control according to the end-period mode discussed earlier with reference to FIG. 4 is conducted and the routine is once terminated.

In the next and following routine cycles, when S30 finds that the gearshift ending gear ratio has been reached or S32 finds that the time T2 has passed, the program goes to S38, in which it is checked whether the time T3 has passed. When the result is NO, the program goes to S40, in which it is again checked whether the change in the degree of throttle opening θTH detected at that time is large. When the result is YES, the program goes to S12, in which, for the reason explained earlier, the same control as when gearshift is not in progress is conducted, and the routine is once terminated. When the result is NO, the program goes to S42, in which the clutch pressure control according to the termination mode discussed earlier with reference to FIG. 4 is conducted.

When S38 finds that the time T3 has passed, since this means that the gearshift is finished, the program goes to S12, in which the control for when gearshift is not in progress is resumed.

As clearly shown in FIG. 3, in S24 and S32, when it is found that time T1 and T2 have passed, respectively, the program goes to S32 and S38, respectively.

As explained in the foregoing, this embodiment detects whether the change in the degree of throttle opening θTH is large, and when the result is affirmative, conducts the control for when gearshift is not in progress, namely, controls the clutch pressure in open-loop fashion to bring it to the value determined for the detected degree of throttle opening θTH in accordance with the predetermined characteristics for the gear ratio. As a result, occurrence of gearshift shock is avoided even when the degree of throttle opening does not accurately indicate the actual engine load.

While the embodiment uses the degree of throttle opening as a parameter indicating the engine load, the engine load can instead be detected from the amount of accelerator pedal manipulation, the intake air pressure, the intake air mass or the like.

While the foregoing description is made taking a hydraulically operated transmission as an example, the invention can also be applied to other types of vehicle transmissions.

While the invention was described with respect to a hydraulically operated transmission, it can also be applied to other types of vehicle transmissions.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A system for controlling hydraulic pressure of a hydraulically operated vehicle transmission, comprising:

vehicle operating condition detecting means for detecting parameters indicative of operating conditions of the vehicle;

gearshift command output means for determining a gear ratio to be shifted to based on the detected parameters, to output a gearshift command;

a plurality of frictional engaging elements for selectively establishing one gear stage in the transmission;

speed detecting means for detecting a rotational speed of at least one of a plurality of rotational members of the transmission which changes at a time of gearshift;

desired rotational speed change rate determining means for determining a desired rotational speed change rate of the one rotational member based on at least one of the detected parameters; and hydraulic pressure control means for controlling a supply of hydraulic pressure to at least one of the frictional engaging elements in response to the gearshift command such that the determined gear ratio is established to transmit engine power to a vehicle wheel, said hydraulic pressure control means operating to control the supply of hydraulic pressure to the frictional engaging element such that a change of the rotational speed of the one rotational member concurs with the desired rotational speed change rate;

wherein said hydraulic pressure control means includes:
parameter fluctuation discriminating means for discriminating whether the at least one of the parameters fluctuates; and
said hydraulic pressure control means discontinues the operation when said parameter fluctuation discriminating means discriminates that the parameter fluctuates, wherein said parameter fluctuation discriminating means discriminates fluctuation of at least one of the parameters by calculating a difference in values of the at least one of the parameters detected at different times.

2. A system according to claim 1, wherein the at least one of the parameters corresponds to engine load.

3. A system according to claim 1, wherein said hydraulic pressure control means controls the supply of hydraulic pressure to be a predetermined value when discontinuing the operation.

4. A system according to claim 3, wherein the predetermined value is set with respect to engine load.

5. A system according to claim 1, wherein said parameter fluctuation discriminating means includes:

difference calculating means for calculating the difference of the at least one of the parameters between those obtained at a different timing; and comparing means for comparing the difference with a reference value; and wherein said parameter fluctuation discriminating means discriminates that the at least one of the parameters fluctuates when the difference exceeds the reference value.

6. A system for controlling hydraulic pressure of a hydraulically operated vehicle transmission, comprising:

vehicle operating condition detecting means for detecting parameters indicative of operating conditions of the vehicle;

gearshift command output means for determining a gear ratio to be shifted to based on the detected parameters, to output a gearshift command;

a plurality of frictional engaging elements for selectively establishing one gear stage in the transmission;

speed detecting means for detecting a rotational speed of at least one of a plurality of rotational members of the transmission which changes at a time of gearshift;

desired rotational speed change rate determining means for determining a desired rotational speed change rate of the one rotational member based on at least one of the detected parameters; and hydraulic pressure control means for controlling a supply of hydraulic pressure to at least one of the frictional engaging elements in response to the gearshift command such that the determined gear ratio is established to transmit engine power to a vehicle wheel, said hydraulic pressure control means operating to control the supply of hydraulic pressure to the frictional engaging element such that a change of the rotational speed of the one rotational member concurs with the desired rotational speed change rate, wherein said hydraulic pressure control means includes: parameter fluctuation discriminating means for discriminating whether the at least one of the parameters fluctuates, wherein said hydraulic pressure control means discontinues the operation when said parameter fluctuation discriminating means discriminates that the parameter fluctuates, wherein said parameter fluctuation discriminating means includes:
difference calculating means for calculating a difference of the at least one of the parameters between those obtained at a different timing, and
comparing means for comparing the difference with a reference value, and
wherein said parameter fluctuation discriminating means discriminates that the at least one of the parameters fluctuates when the difference exceeds the reference value.

7. A system according to claim 6, wherein the at least one of the parameters corresponds to engine load.

8. A system according to claim 6, wherein said hydraulic pressure control means controls the supply of hydraulic pressure to be a predetermined value when discontinuing the operation.

9. A system according to claim 8, wherein the predetermined value is set with respect to engine load.

* * * * *